(12) United States Patent
Terada et al.

(10) Patent No.: US 11,475,606 B2
(45) Date of Patent: Oct. 18, 2022

(54) OPERATION GUIDING SYSTEM FOR OPERATION OF A MOVABLE DEVICE

(71) Applicant: SCHNEIDER ELECTRIC JAPAN HOLDINGS LTD., Tokyo (JP)

(72) Inventors: Toru Terada, Osaka (JP); Soichi Ebisuno, Osaka (JP); Kenji Iwano, Kadoma (JP)

(73) Assignee: SCHNEIDER ELECTRIC JAPAN HOLDINGS LTD., Tokyo (JP)

( * ) Notice: Subject to any disclaimer, the term of this patent is extended or adjusted under 35 U.S.C. 154(b) by 99 days.

(21) Appl. No.: 16/767,382

(22) PCT Filed: May 15, 2018

(86) PCT No.: PCT/JP2018/018684
§ 371 (c)(1),
(2) Date: May 27, 2020

(87) PCT Pub. No.: WO2019/106862
PCT Pub. Date: Jun. 6, 2019

(65) Prior Publication Data
US 2020/0394823 A1    Dec. 17, 2020

(30) Foreign Application Priority Data

Nov. 28, 2017  (JP) .............................. JP2017-228079

(51) Int. Cl.
*G06T 11/00* (2006.01)
*G06T 7/73* (2017.01)
(Continued)

(52) U.S. Cl.
CPC .............. *G06T 11/00* (2013.01); *B25J 13/02* (2013.01); *B25J 19/023* (2013.01); *G06F 3/14* (2013.01);
(Continued)

(58) Field of Classification Search
None
See application file for complete search history.

(56) References Cited

U.S. PATENT DOCUMENTS 9,527,214 B2 * 12/2016 Kondo .................. B25J 9/1697
9,817,396 B1 * 11/2017 Takayama ............ G08G 5/0013
(Continued)

FOREIGN PATENT DOCUMENTS

CN       107223082       9/2017
JP       2007-236008     9/2007
(Continued)

OTHER PUBLICATIONS

International Search Report for PCT/JP2018/018684, dated Aug. 7, 2018, 4 pages.
(Continued)

*Primary Examiner* — Hilina K Demeter
(74) *Attorney, Agent, or Firm* — Nixon & Vanderhye, PC (57) ABSTRACT

System includes: an operation terminal that (i) receives an operation instruction that is given by the operator to a movable section of a machine and (ii) senses an operation standby state that allows the operation instruction to be received; an image sensor estimating section configured to estimate a positional relationship between the operator and the machine; a model generating section configured to, in response to sensing of the operation standby state by the operation terminal, generate an operating direction indicating image; and in accordance with the positional relationship, in a direction that is in accordance with a direction in which the operator views the machine, the operating direction indicating image indicating an operating direction of the movable section; an combining section configured to generate a combined image obtained by combining the operat-
(Continued)

ing direction indicating image with a captured image of the movable section that has been photographed.

5 Claims, 8 Drawing Sheets (51) Int. Cl.
*B25J 13/02* (2006.01)
*B25J 19/02* (2006.01)
*G06F 3/14* (2006.01)
*G06F 3/044* (2006.01)

(52) U.S. Cl.
CPC .............. *G06T 7/73* (2017.01); *G06F 3/044* (2013.01); *G06T 2207/10012* (2013.01)

(56) References Cited

U.S. PATENT DOCUMENTS

| | | | | |
|---|---|---|---|---|
| 9,849,981 | B1* | 12/2017 | Burgess | ............... B64C 39/024 |
| 10,852,847 | B2* | 12/2020 | Hesch | ................ G06F 3/03547 |
| 2014/0121834 | A1 | 5/2014 | Ogawa et al. | |
| 2015/0066212 | A1 | 3/2015 | Yahaba | |
| 2016/0158937 | A1* | 6/2016 | Kamoi | ................... B25J 9/1605 |
| | | | | 901/5 |
| 2016/0349835 | A1* | 12/2016 | Shapira | ................... G06F 3/016 |
| 2017/0078565 | A1* | 3/2017 | Ito | ...................... H04N 5/23229 |
| 2018/0098052 | A1* | 4/2018 | Black | ...................... G06T 17/00 |

FOREIGN PATENT DOCUMENTS

| | | |
|---|---|---|
| JP | 2008-070817 | 3/2008 |
| JP | 2009-119579 | 6/2009 |
| JP | 2011-161586 | 8/2011 |
| JP | 2012-218120 | 11/2012 |
| JP | 2013-22651 | 2/2013 |
| JP | 2014-235841 | 12/2014 |
| JP | 2015-45990 | 3/2015 |
| JP | 2016-107379 | 6/2016 |
| JP | 2017-100204 | 6/2017 |

OTHER PUBLICATIONS

Written Opinion of the ISA for PCT/JP2018/018684, dated Aug. 7, 2018, 4 pages.
International Preliminary Report for PCT/JP 2018/018684, dated May 28, 2020, 5 pages.
Extended European Search Report for 18882638.2 dated Nov. 18, 2021, 11 pages.

* cited by examiner

OPERATION GUIDING SYSTEM FOR OPERATION OF A MOVABLE DEVICE

This application is the U.S. national phase of International Application No. PCT/JP2018/018684 filed 15 May 2018, which designated the U.S. and claims priority to JP Patent Application No. 2017-228079 filed 28 Nov. 2017, the entire contents of each of which are hereby incorporated by reference.

TECHNICAL FIELD

The present invention relates to an operation guidance system for providing guidance on operation of an operation target object.

BACKGROUND ART

During operation of, for example, a machine including a movable section, guidance on the operation has been conventionally displayed so that details of the operation are intelligibly presented to an operator.

Examples of such operation guidance include use of an augmented reality (AR) technique to display operation guidance so that the operation guidance is superimposed on an image of an operation target object.

Patent Literature 1 discloses a robot operation system configured such that (i) a line image that shows an operating state of a robot in an identifiable manner is generated based on acquired information on a position of a user and a user's visual field and (ii) a spectacle-type display unit displays the line image thus generated by superimposing the line image on the user's visual field.

Patent Literature 2 discloses a head-mounted display that (i) includes a pressing switch that can be subjected to a half depressing operation and a full depressing operation and (ii) displays, before the full depressing operation is carried out with respect to the pressing switch, a position, selected through the half depressing operation, at which to provide the pressing switch.

Patent Literature 3 discloses an operation device for remotely operating a robot including a movable section. The operation device that has detected a switch operation carried out in an amount less than a predetermined amount displays (i) a first movable part image of a movable member that operates in response to the switch operation and (ii) a second movable part image of another non-operating movable member so that the first and second movable part images are identifiable by, for example, color.

CITATION LIST

Patent Literatures

[Patent Literature 1]
Japanese Patent Application Publication Tokukai No. 2017-100204 (Publication date: Jun. 8, 2017)
[Patent Literature 2]
Japanese Patent Application Publication Tokukai No. 2008-70817 (Publication date: Mar. 27, 2008)
[Patent Literature 3]
Japanese Patent Application Publication Tokukai No. 2011-161586 (Publication date: Aug. 25, 2011)

SUMMARY OF INVENTION

Technical Problem

According to (i) a system in which an augmented reality technique is employed and (ii) the robot operation system disclosed in Patent Literature 1, information for guidance can be displayed at a position of an operation target object or in a specific part by specifying a positional relationship between an operator and the operation target object. Note, however, that it is impossible to notify the operator, in advance of operation of the operation target object, how the operation target object will operate in response to operation carried out by the operator based on such information.

According to the head-mounted display disclosed in Patent Literature 2, it is impossible to specify a positional relationship between an operator and an operation target object. An operating direction, viewed from the operator, of the operation target object varies depending on the positional relationship between the operator and the operation target object. As such, according to the head-mounted display, it is impossible to (i) specify the operating direction of the operation target object and (ii) notify the operator of the operating direction.

According to the device disclosed in Patent Literature 3, the operator can intuitively show an operating direction of the movable member to be operated. However, since the operation device for remotely operating the movable member of the robot is provided at a fixed position, a positional relationship between the operation device and the robot is not reflected in the operating direction of the movable member. Thus, in a case where the operator operates the movable member without remaining at a fixed position, a movement direction of the movable member is unfortunately unintelligible to the operator depending on a position of the operator.

Figure 8A:
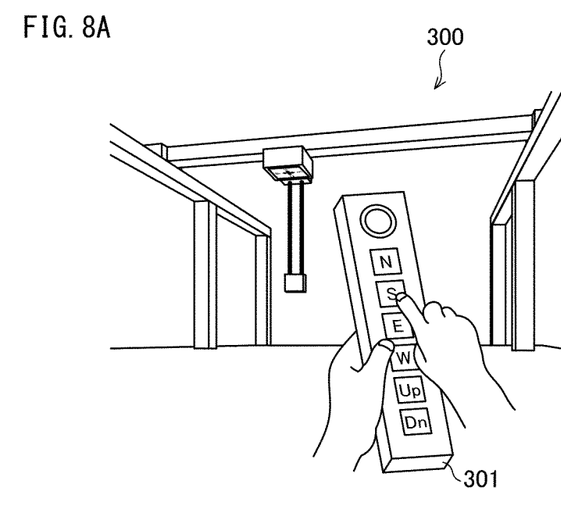
FIG. 8A is a perspective view illustrating a state in which an operator is operating a movable section of a crane to be operated by a conventional system.
Figure 8B:
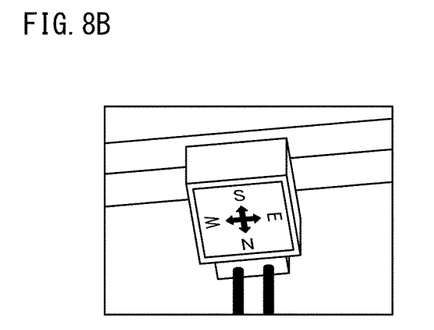
FIG. 8B is a view illustrating how the conventional system displays an operation guidance image including an operating direction of the movable section.

For example, during operation of a crane 300 with use of an operation terminal 301 as illustrated in FIG. 8A, a direction in which the crane 300 moves in a case where a switch of the operation terminal 301 is pressed is shown, by letters, in an operation guidance image as illustrated in FIG. 8B.

Note, however, that a movement direction, viewed from an operator, of the crane 300 varies depending on a position of the operator. Thus, in a case where the movement direction of the crane 300 is shown in always the same manner but the operator moves to, for example, a position that is opposite to the crane 300, the movement direction of the crane 300, which movement direction is shown in the operation guidance image, is opposite to the operator. This makes it difficult for the operator to understand a direction in which to operate the crane 300.

An object of an aspect of the present invention is to provide an operating direction of an operation target object in an intelligible manner regardless of a position of an operator.

Solution to Problem

In order to attain the object, an operation guidance system in accordance with an aspect of the present invention is an operation guidance system for providing an operator with guidance on operation of a movable device including a movable section to be operated, the operation guidance system including: an operation device that (i) receives an operation instruction that is given by the operator to the movable section and (ii) senses an operation standby state that allows the operation instruction to be received; a photographing device that photographs a photographing target object that is located in a direction in which the operator is looking; an estimation section configured to estimate a positional relationship between the operator and the movable device; an image generating section configured to, in response to sensing of the operation standby state by the operation device, generate an operating direction indicating image, in accordance with the positional relationship, in a direction that is in accordance with a direction in which the operator views the movable device, the operating direction indicating image indicating an operating direction of the movable section, the movable section operating in accordance with the operation instruction; an image combining section configured to generate a combined image obtained by combining the operating direction indicating image with a captured image of the movable device that has been photographed by the photographing device; and a display device that displays the combined image.

Advantageous Effects of Invention

An aspect of the present invention makes it possible to provide an operating direction of an operation target object in an intelligible manner regardless of a position of an operator.

DESCRIPTION OF EMBODIMENTS

Embodiment 1

Embodiment 1 of the present invention is as described below with reference to FIGS. 1 to 5.

Figure 1:
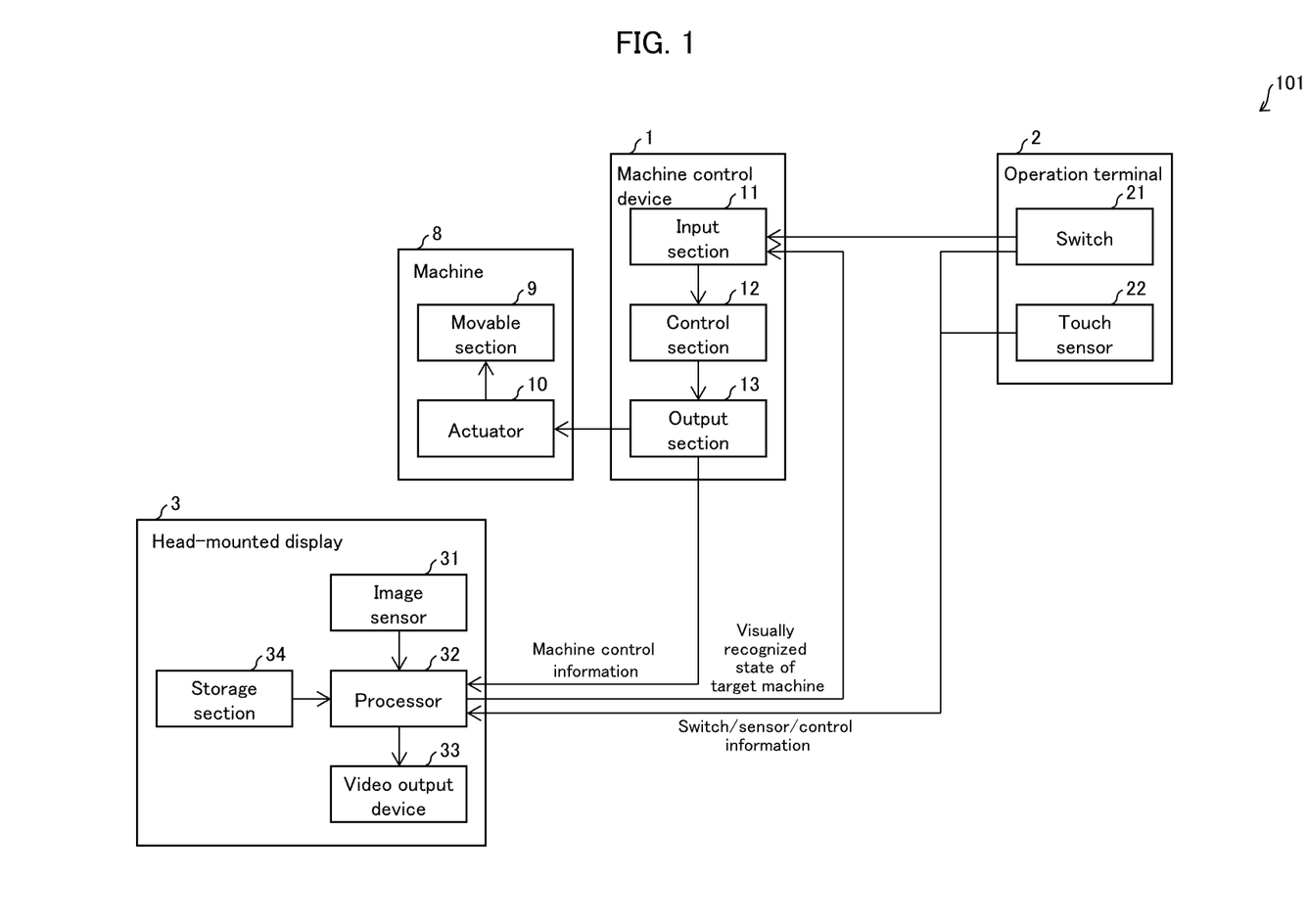
FIG. 1 is a block diagram illustrating a configuration of an operation guidance system in accordance with Embodiment 1 of the present invention.

FIG. 1 is a block diagram illustrating a configuration of an operation guidance system 101 in accordance with Embodiment 1.

As illustrated in FIG. 1, the operation guidance system 101 includes a machine control device 1 (control device), an operation terminal 2 (operation device), and a head-mounted display (hereinafter also referred to as an "HMD") 3.

First, the following description will discuss a machine 8 (movable device) that the machine control device 1 controls. The machine 8 includes at least one movable section 9 and at least one actuator 10. The at least one movable section 9 is provided so as to be movable in a predetermined direction within a predetermined range. The at least one actuator 10 is a device for driving the at least one movable section 9. The number of the at least one actuator 10 provided is in accordance with the number of directions (axes) in/on which to move the at least one movable section 9.

The machine control device 1 is a device for controlling operation of the machine 8 (the at least one actuator 10). The machine control device 1 includes an input section 11, a control section 12, and an output section 13.

The input section 11 serves as an interface part that receives (i) information obtained from the operation terminal 2 and (ii) information obtained from the HMD 3.

The control section 12 generates, in accordance with information that has been supplied from the input section 11, machine control information (control information) for controlling the machine 8. Examples of the machine control information include an operating mode of the machine 8, various settings, a current position of the at least one actuator 10, and a current angle of the at least one actuator 10.

The output section 13 serves as an interface part that outputs the machine control information that has been obtained from the control section 12.

The operation terminal 2 is a device with respect to which an operator is to carry out an input of an operation instruction to operate the machine 8. The operation terminal 2 includes a switch 21 and a touch sensor 22.

The switch 21 (i) is a pressing type input device that receives the operation instruction and (ii) is turned on to operate in response to a pushing operation carried out by the operator. The switch 21 outputs switch information indicating that the pushing operation has been carried out. The switch 21 includes switches 21 whose number is in accordance with types of operations.

A switch 21 can be a mechanical switch or can be configured by a touch panel. For the switch 21 that is configured by a touch panel, it is possible to use a touch panel that is of a hover detection type and makes it possible to detect a position of a finger of the operator before the touch panel is touched with the finger. Use of the switch 21 for which such a touch panel is used makes it possible to dispense with the touch sensor 22.

The touch sensor 22 is provided on the switch 21 and senses, by, for example, a change in capacitance, that the switch 21 has been touched with the finger of the operator. The touch sensor 22 outputs touch sensor information indicative of a result of sensing that the switch 21 has been touched with the finger of the operator.

Examples of a sensor that senses that the switch 21 has been touched with the finger include not only the touch sensor 22 but also a photosensor and a two-stage switch.

The operation terminal 2 can include an enabling switch and an operation switch instead of the switch 21 and the touch sensor 22. The operation terminal 2 can be configured to (i) display a guidance display model as described later in a case where only the operation switch is pushed and (ii) operate the machine 8 in a case where both the enabling switch and the operation switch are pushed.

The operation terminal 2 that has recognized an operation standby state externally outputs touch sensor information that is supplied from the touch sensor 22. The operation standby state is a state (i) in which the switch 21 is being touched with the finger of the operator but has not been pushed firmly enough for the switch 21 to be turned on and (ii) that allows the operation instruction to be received. Furthermore, the operation terminal 2 (i) receives the operation instruction in a state in which the switch 21 is being touched with the finger of the operator firmly enough to be turned on and (ii) externally outputs, in a form of the switch information, an ON signal that is supplied from the switch 21.

Note that the operation device can alternatively be a switch that (i) cannot receive, as operation, a push that has been made only once and (ii) can receive, as operation, a push that has been made twice. In a case where such a switch is used, first operation corresponds to the operation standby state.

The HMD 3 is a head-mounted display device. The HMD 3 includes an image sensor 31 (photographing device), a processor 32, a video output device 33 (display device), and a storage section 34.

The image sensor 31 is a sensor that (i) photographs a photographing target object that is located in a direction in which a face of the operator who is wearing the HMD 3 faces and (ii) outputs captured image information. The image sensor 31 photographs a subject that is located in a direction in which the operator is looking (a direction in which the face of the operator faces).

The processor 32 generates, in accordance with input information, a combined image in which the guidance display model is shown while being superimposed on an image of the machine 8 at which the operator is looking. Examples of the input information that is supplied to the processor 32 include the captured image information that has been obtained from the image sensor 31, the machine control information that has been obtained from the machine control device 1, the switch information that has been obtained from the operation terminal 2, the touch sensor information, and machine model information stored in the storage section 34 (described later). Furthermore, in accordance with the captured image information that has been obtained from the image sensor 31, the processor 32 transmits, to the input section 11, visual recognition information indicating that the operator is visually recognizing the machine 8.

The video output device 33 is a device (e.g., a liquid crystal display) that displays, in front of operator's eyes, the combined image that has been supplied from the processor 32.

The storage section 34 is configured by, for example, a memory and stores therein the machine model information. The machine model information is information indicative of, for example, an entire shape of the machine 8 and a shape of the at least one movable section 9. As the machine model information, computer aided design (CAD) data, for example is used.

Note that it is possible to allow the machine model information to be externally obtained.

Figure 2:
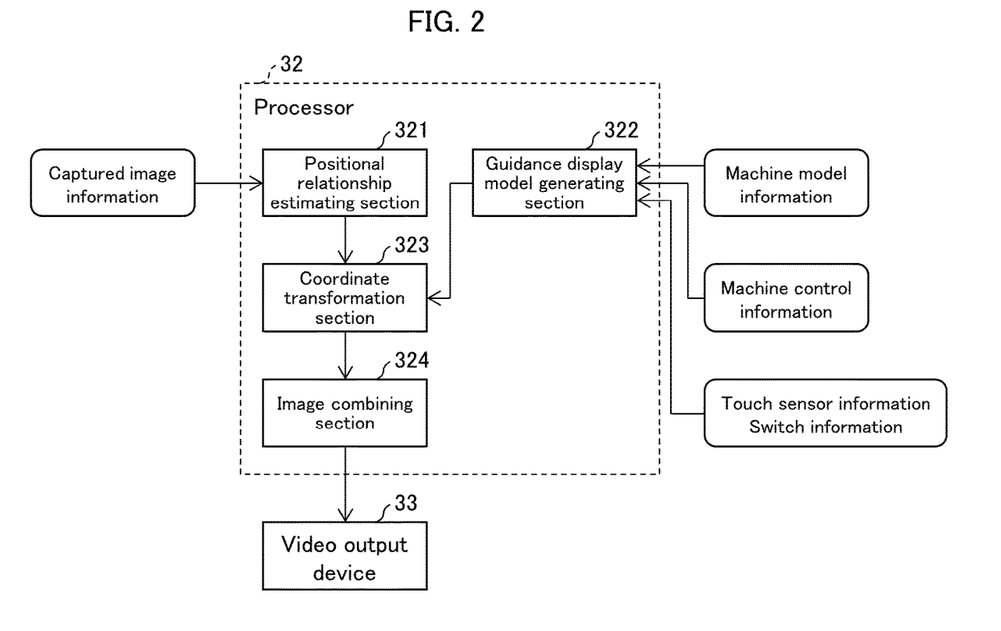
FIG. 2 is a block diagram illustrating a configuration of a processor provided in a head-mounted display of the operation guidance system.

Subsequently, the following description will more specifically discuss the processor 32. FIG. 2 is a block diagram illustrating a configuration of the processor 32.

As illustrated in FIG. 2, the processor 32 includes a positional relationship estimating section 321 (estimation section), a guidance display model generating section (hereinafter referred to as a "model generating section") 322 (image generating section), a coordinate transformation section 323 (image generating section), and an image combining section 324.

The positional relationship estimating section 321 estimates a positional relationship between the operator and the machine 8 in accordance with the captured image information that has been obtained from the image sensor 31. Specifically, the positional relationship estimating section 321 recognizes a size of an image of the machine 8 from the captured image information and calculates a distance between the operator and the machine 8 by comparing (i) a reference relationship between (a) a size of the image of the machine 8 and (b) the distance and (ii) the recognized size of the image. Furthermore, the positional relationship estimating section 321 calculates, from an inclination, from the front, of the image recognized, an angle (orientation) of the operator with respect to the front of the machine 8. The positional relationship estimating section 321 outputs, in a form of estimated information on the positional relationship, the distance calculated and the angle calculated. In accordance with the positional relationship that has been estimated by the positional relationship estimating section 321, it is possible to specify a direction in which the operator views the machine 8.

The positional relationship estimating section 321 can alternatively be configured to estimate the positional relationship between the operator and the machine 8 in accordance with information different from the captured image information that has been obtained from the image sensor 31.

Examples of such information include image information on the face of the operator who has been photographed by a camera provided in the machine 8. The machine 8 (i) carries out face authentication in accordance with an image of the face of the operator and (ii) transmits, to the HMD 3 via the machine control device 1, a facial image of the operator who has been authenticated as having operated the machine 8. In accordance with the facial image of the operator, which facial image has been obtained from the camera, the positional relationship estimating section 321 estimates the positional relationship between the operator and the machine 8 by a method similar to the method for estimating the positional relationship from the captured image information that has been obtained from the image sensor 31.

Examples of the information also include image information on the operator who has been photographed by a plurality of cameras provided on, for example, a ceiling of a room in which the machine 8 is provided. The positional relationship estimating section 321 (i) analyzes a plurality of pieces of image information which pieces have been obtained from the respective plurality of cameras and (ii) estimates the positional relationship between the operator and the machine 8 by specifying (a) a direction in which the operator is facing and (b) a distance between the operator and the machine 8.

Examples of the information further include a position detecting signal obtained through a global positioning system (GPS) and detecting respective positions of the operator and the machine 8. The positional relationship estimating section 321 estimates, from such a position detecting signal, the positional relationship between the operator and the machine 8.

The model generating section 322 generates three-dimensional model data indicative of the guidance display model that provides guidance on operation of the machine 8. The guidance display model is a model indicative of, for example, a direction in which the at least one movable section 9 of the machine 8 operates in accordance with operation carried out with respect to the switch 21 by the operator. The model generating section 322 generates the three-dimensional model data in accordance with the machine model information that has been obtained from the storage section 34, the machine control information that has been obtained from the machine control device 1, the switch information that has been obtained from the operation terminal 2, and the touch sensor information.

The coordinate transformation section 323 transforms coordinates of the three-dimensional model data, which has been obtained from the model generating section 322, so that the guidance display model can be displayed in a direction that is in accordance with the direction in which the operator views the machine 8. In order to thus display the guidance display model, the coordinate transformation section 323 transforms the coordinates of the three-dimensional model data in accordance with the positional relationship in accordance with which the direction in which the operator views the machine 8 can be specified.

The image combining section 324 combines the three-dimensional model data and the captured image information (captured image data) so that the three-dimensional model data whose coordinates have been transformed is superimposed on a captured image. The image combining section 324 supplies, to the video output device 33, combined image data obtained by thus combining the three-dimensional model data and the captured image information.

Figure 3:
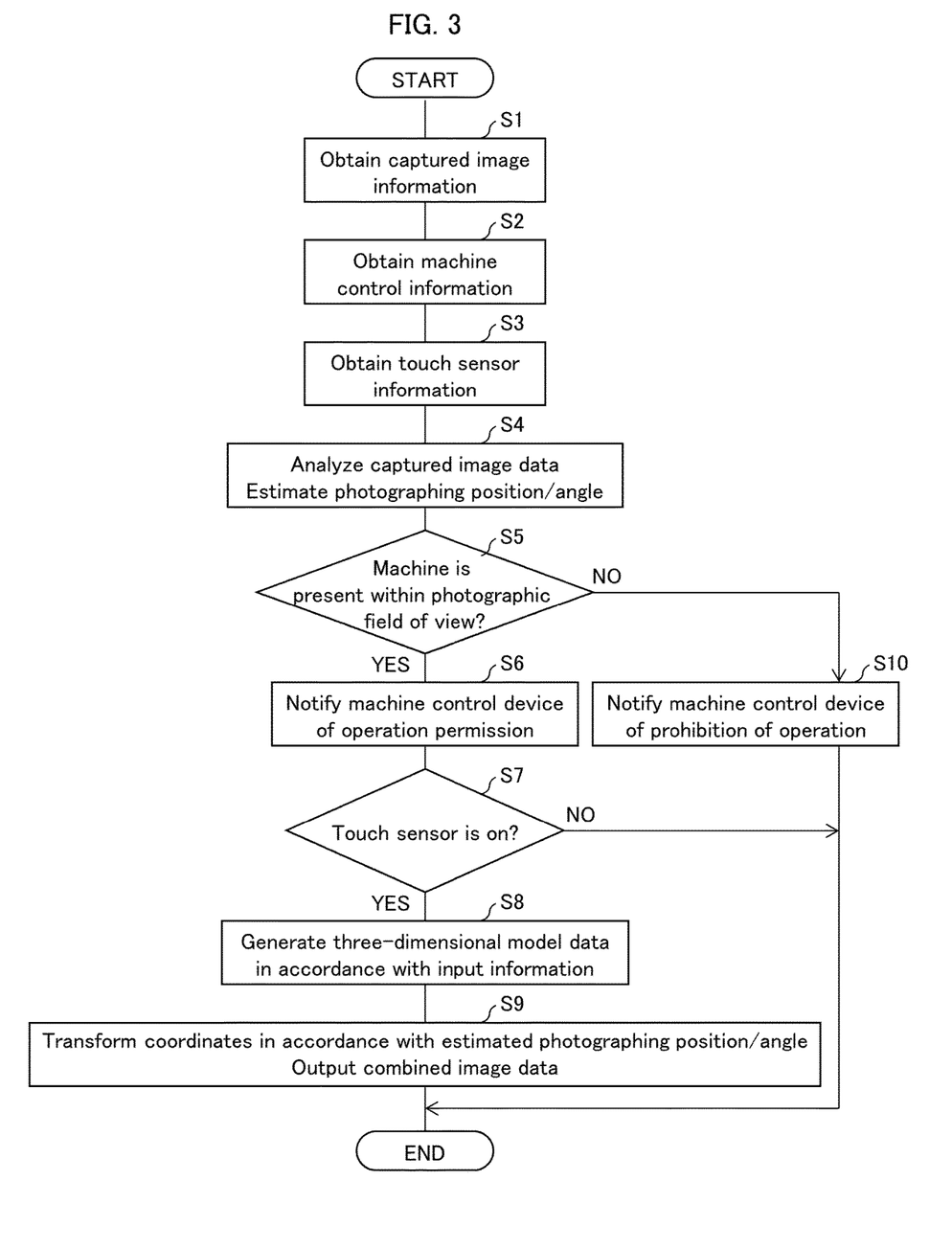
FIG. 3 is a flowchart showing an operation procedure carried out by the operation guidance system.

The following description will discuss operation of the operation guidance system 101 configured as described above. FIG. 3 is a flowchart showing an operation procedure carried out by the operation guidance system 101.

As illustrated in FIG. 3, first, the processor 32 obtains, in the HMD 3, the captured image information that has been obtained from the image sensor 31 (step S1). Furthermore, the processor 32 obtains the machine control information that has been obtained from the machine control device 1 (step S2). Moreover, the operation processor 32 obtains the touch sensor information from the terminal 2 (step S3).

The positional relationship estimating section 321 (i) analyzes the captured image data that is included in the captured image information and (ii) estimates a photographing position with respect to the machine 8 and a photographing angle with respect to the machine 8 (step S4). The positional relationship estimating section 321 estimates the positional relationship between the operator and the machine 8 by estimating the photographing position and the photographing angle.

The photographing position is a position at which the operator is present during photographing of the machine 8 by the HMD 3 that is worn by the operator. The photographing angle is an angle of inclination of a part of the machine 8, which part faces the operator, with respect to the front of the machine 8.

The positional relationship estimating section 321 of the processor 32 determines, in accordance with the captured image information, whether the machine 8 is present within an operator's visual field, which is a range within which the image sensor 31 carries out photographing (step S5). The positional relationship estimating section 321 that has determined that the machine 8 is present within the operator's visual field (YES in step S5) notifies the machine control device 1 of an operation permission to operate the machine 8 (step S6). The positional relationship estimating section 321 notifies the machine control device 1 of the operation permission by transmitting information on a visually recognized state of the machine 8 (information indicating that the operator is visually recognizing the machine 8).

Note here that the processor 32 determines, in accordance with presence of the touch sensor information that has been obtained from the touch sensor 22, whether the touch sensor 22 is on (step S7). In a case where the processor 32 has determined that the touch sensor 22 is on (YES in step S7), the model generating section 322 generates the three-dimensional model data in accordance with the input information (step S8).

The model generating section 322 specifies, in accordance with the touch sensor information, the switch 21 that the operator has touched. Furthermore, the model generating section 322 uses the machine model information to generate, in a form of the three-dimensional model data, image data of an image indicative of an operating direction of the at least one movable section 9 that is operated by the switch 21 specified. Moreover, the model generating section 322 specifies, in accordance with a current position of the at least one movable section 9 which current position is specified by the machine control information, a position at which to provide a three-dimensional model.

The coordinate transformation section 323 transforms the coordinates of the three-dimensional model data in accordance with the positional relationship between the operator and the machine 8, which positional relationship has been estimated (step S9). The image combining section 324 outputs the combined image data by combining (i) the three-dimensional model data whose coordinates have been transformed and (ii) the captured image data (step S9).

The coordinate transformation section 323 (i) recognizes, from the above positional relationship, (a) a distance between a position of the operator and the machine 8 and (b) an angle at which the operator faces the machine 8 with respect to the front of the machine 8, and (ii) recognizes, mainly from the angle, a direction, indicated by the three-dimensional model, with respect to the operator. Then, the coordinate transformation section 323 (i) calculates, from the direction, direction specifying coordinates that are included in the three-dimensional model data and specify a direction in the three-dimensional model data, and (ii) replaces, with the direction specifying coordinates thus calculated, direction specifying coordinates that have not been transformed.

For example, in a case where the three-dimensional model is an arrow, (i) a set of coordinates at a pointed end of the arrow and (ii) a set of coordinates at a rear end of the arrow each serve as direction specifying coordinates. In view of this, the coordinate transformation section 323 that has calculated (i) direction specifying coordinates at the pointed end of the arrow and (ii) direction specifying coordinates at the rear end of the arrow replaces, with the direction specifying coordinates calculated, the direction specifying coordinates that have been obtained from the model generating section 322 and are included in the three-dimensional model data.

The positional relationship estimating section 321 (an operation prohibiting section) that has determined that the machine 8 is not present in the operator's visual field (NO in step S5) (i) notifies the machine control device 1 of prohibition of operation of the machine 8 (hereinafter referred to as "operation prohibition") (step S10) and then (ii) ends the process. The positional relationship estimating section 321 notifies the machine control device 1 of the operation prohibition by transmitting, to the machine control device 1, information on the visually recognized state of the machine 8 (information indicating that the operator is not visually recognizing the machine 8).

The processor 32 that has determined that the touch sensor 22 is off also ends the process (NO in step S7).

In accordance with the combined image data, the video output device 33 displays, as an operation guidance image, the combined image in which the guidance display model (three-dimensional model) is shown in a captured image of the machine 8.

The control section 12 of the machine control device 1 which control section 12 has received a notification (command) of the operation permission from the positional relationship estimating section 321 operates the at least one actuator 10. In contrast, the control section 12 that has received a notification (command) of the operation prohibition from the positional relationship estimating section 321 does not operate the at least one actuator 10 even in a case where the control section 12 has received the switch information from the operation terminal 2.

As described earlier, the positional relationship estimating section 321 prohibits operation of the machine 8 in a case where no machine 8 (no movable section 9 to be operated) is shown in a captured image, i.e., in a case where no machine 8 is present in the operator's visual field. This makes it possible to nullify operation carried out by the operation terminal 2. As such, it is possible to avoid an operational error that occurs in a case where the operator who is not looking at the machine 8 operates the operation terminal 2.

Furthermore, the positional relationship estimating section 321 (a direction display section) can notify the machine control device 1 of the operation prohibition by causing the video output device 33 to display the direction in which the operator views the machine 8. This makes it possible to urge the operator to look at the machine 8.

Moreover, the positional relationship estimating section 321 (a warning section) can notify the machine control device 1 of the operation prohibition by issuing a warning of the operation prohibition in a case where it is sensed by the touch sensor information that the touch sensor 22 is on or in a case where it is sensed by the switch information that the switch 21 is on. Specifically, the positional relationship estimating section 321 can cause the video output device 33 to display the warning or can cause a loud speaker provided in the HMD 3 to output the warning by voice. This makes it possible to urge the operator to look at the machine 8.

Further, the positional relationship estimating section 321 (a direction changing section) can transmit, to the machine control device 1, an instruction to change, in accordance with the positional relationship estimated, an operating direction of the at least one movable section 9 that operates in accordance with the operation instruction that is supplied to the operation terminal 2 through operation of the switch 21. In response to the instruction, the machine control device 1 controls the at least one actuator 10 so as to cause the at least one movable section 9 to operate in the operating direction thus changed.

As described earlier, in a case where the operating direction of the at least one movable section 9 which operating direction corresponds to the operation instruction is changed, the operating direction of the movable section which operating direction is made unintelligible depending on a position of the operator with respect to the machine 8 can be made more intelligible. Assume, for example, that the operator operates the machine 8 from the back side of the machine 8, whereas the operator ordinarily operates the machine 8 while facing the front of the machine 8. In this case, a sense of operation of the at least one movable section 9 is opposite from an ordinary sense of operation of the at least one movable section 9. In view of this, in a case where the operating direction of the at least one movable section 9 which operating direction corresponds to the operation instruction that is given through operation of the switch 21 is oppositely changed, the operator who operates the machine 8 from the back side of the machine 8 can also have a sense of operation which sense is identical to a sense of operation which sense is possessed by the operator who operates the machine 8 while facing the front of the machine 8. Furthermore, also in a case where operation of the machine 8 at a fixed position is difficult as in outer space, the operating direction of the at least one movable section 9 which operating direction corresponds to the operation instruction is preferably changed as needed from the viewpoint that a sense of operation is kept constant.

Note, however, that, in a case where the operating direction is changed with timing that is unintended by the operator, an operational error is more likely to occur. As such, the positional relationship estimating section 321 uses an output means identical to that used to issue the warning (described earlier) of the operation prohibition to report that the operating direction of the at least one movable section 9 which operating direction corresponds to the switch 21 has been changed. Alternatively, the positional relationship estimating section 321 can be configured to stop, while the operator is operating the operation terminal 2 (including the operation standby state and a predetermined period (e.g., several seconds) after most recent operation of the operation terminal 2 is finished), transmitting an instruction on a change in operating direction to the machine control device 1.

Subsequently, the following description will discuss a specific example of operation guidance carried out by the operation guidance system 101.

Figure 4A:
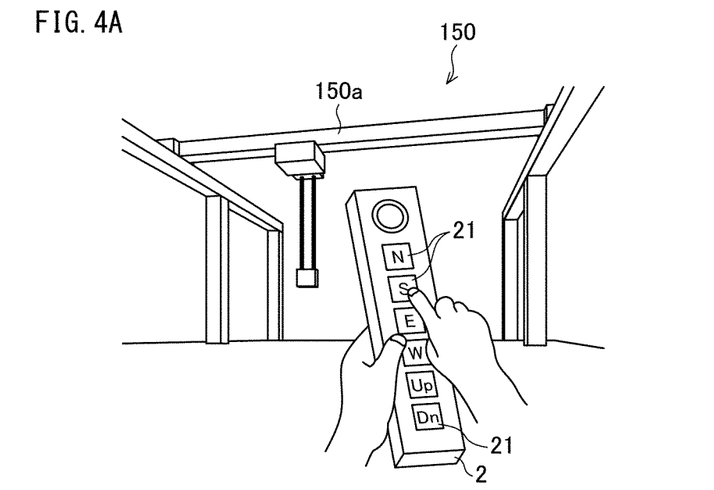
FIG. 4A is a perspective view illustrating a state in which an operator is operating a movable section of a crane to be operated by the operation guidance system.
Figure 4B:
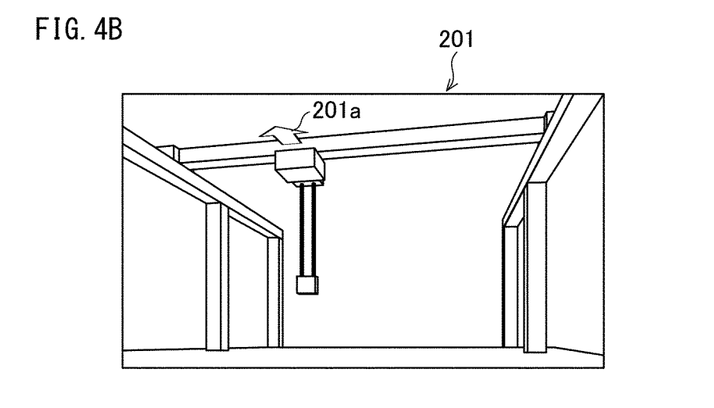
FIG. 4B is a view illustrating how the operation guidance system displays an operation guidance image including an operating direction of the movable section.
Figure 4C:
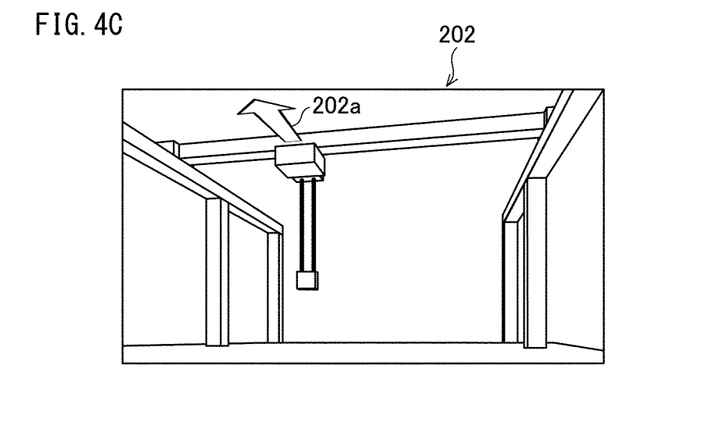
FIG. 4C is a view illustrating another operation guidance image.

FIG. 4A is a perspective view illustrating a state in which an operator is operating a movable section 150a of a crane 150 to be operated by the operation guidance system 101. FIG. 4B is a view illustrating how the operation guidance system 101 displays an operation guidance image 201 including an operating direction of the movable section 150a. FIG. 4C is a view illustrating another operation guidance image 202. FIGS. 5A-5D are views each illustrating an operation guidance image 210 of a manipulator to be operated by the operation guidance system 101.

As illustrated in FIG. 4A, in case where the crane 150 to be operated and serving as the machine 8 is operated with use of the operation terminal 2, the operation guidance image 201 illustrated in FIG. 4B is displayed in the HMD 3 that is worn by the operator. In this state, a part of the crane 150 which part includes the movable section 150a is photographed by the image sensor 31 and is present in the operator's visual field. In this state, an arrow 201a (operating direction indicating image) indicating a direction in which the movable section 150a operates is shown, as the guidance display model, in the operation guidance image 201. This allows the operator to understand the operating direction of the movable section 150a that is operated by the switch 21 that the operator has touched in the operation terminal 2. Then, the operator can operate the movable section 150a by pushing the switch 21.

In a case where the operator changes a position at which to operate the movable section 150a, the processor 32 (*i*) newly calculates a positional relationship between the operator and the crane 150 and (ii) outputs combined image data obtained by combining (a) three-dimensional model data generated in accordance with the positional relationship and (b) captured image data obtained by photographing the movable section 150a from a changed position of the operator. This causes the operation guidance image 201 that has been newly obtained to include (i) the crane 150 that is viewed from the changed position of the operator and (ii) the arrow 201a that indicates the operating direction of the movable section 150a. Thus, even in a case where the operator changes a position with respect to the crane 150, the operating direction of the movable section 150a is indicated in accordance with the position changed. This makes it easy for the operator to understand the direction in which the movable section 150a operates.

In a case where the crane 150 is provided with operating modes, which are a high speed operating mode and a low speed operating mode, a length of the arrow 201a can be represented as an operating speed of the movable section 150a, i.e., a difference between the high speed operating mode and the low speed operating mode. Specifically, in the case of the low speed operating mode, the arrow 201a that is short is shown in the operation guidance image 201 illustrated in (b) of FIG. 4. In the case of the high speed operating mode, an arrow 202a (operating direction indicating image) that is long is shown in the operation guidance image 202 illustrated in (c) of FIG. 4. This allows the operator to visually distinguish between the operating modes.

The arrows 201a and 202a (each serving as the guidance display model) thus can express information different from the operating direction of the movable section 150a.

Figure 5A:
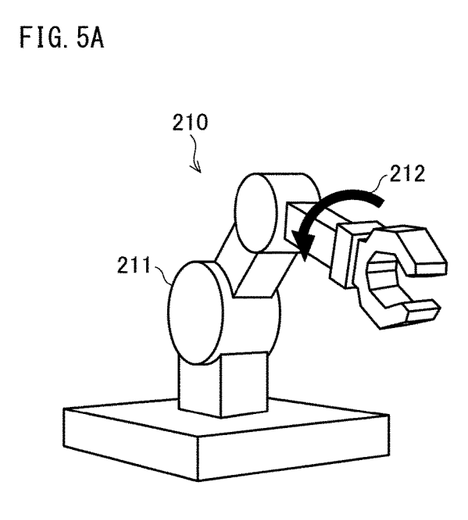
FIGS. 5A-5D are views each illustrating an operation guidance image of a manipulator to be operated by the operation guidance system.
Figure 5B:
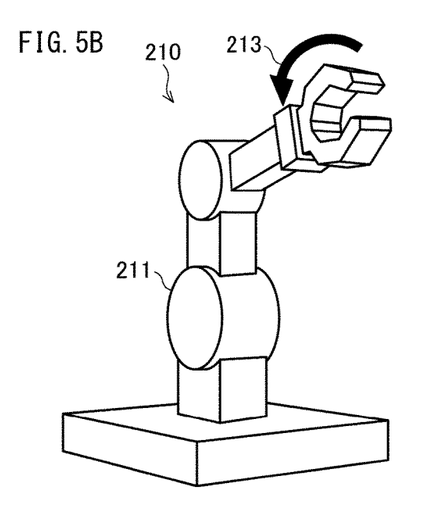
Figure 5C:
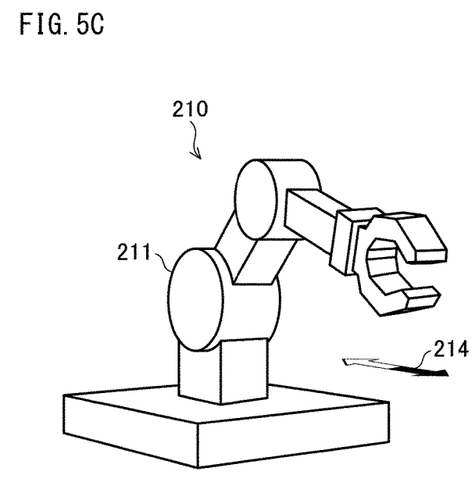
Figure 5D:
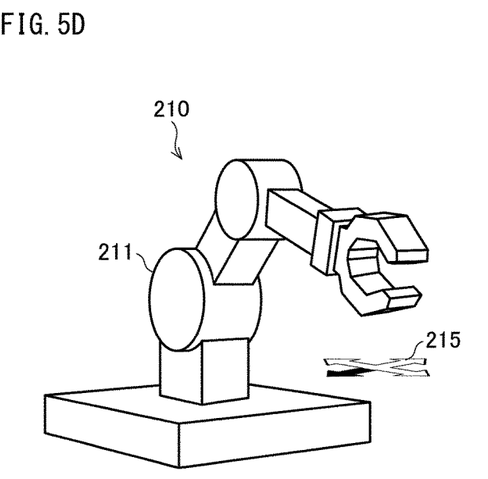

In case where the manipulator to be operated and serving as the machine 8 is operated with use of the operation terminal 2, the operation guidance image 210 illustrated in each of FIGS. 8A-5D is displayed in the HMD 3 that is worn by the operator. In the operation guidance image 210, (i) an actual image of a manipulator 211 and (ii) an arrow 212 (the guidance display model) indicating a direction in which the manipulator 211 operates are shown.

As illustrated in FIGS. 5A and 5B, the arrow 212 and an arrow 213 are each provided near the at least one movable section 9 (a hand of the manipulator 211) corresponding to the switch 21 that the operator has touched. Respective positions of the arrows 212 and 213 are determined by the model generating section 322 in accordance with, for example, a current position and an angle of an actuator (the at least one actuator 10) of the manipulator 211, the current position and the angle each being obtained from the machine control information.

In the operation guidance image 210 illustrated in each of (c) and (d) of FIG. 5, an operating mode that is obtained from the machine control information is reflected. Assume that the operating mode is a single axis specification mode in which to operate the movable section 9 in a direction in which a specified single axis extends. In this case, in the operation guidance image 210 illustrated in (c) of FIG. 5, one of single-axis arrows that extend in respective two directions, the one indicating an operating direction of the at least one movable section 9, is shown so as to be different in color from the other one of the single-axis arrows. Assume that the operating mode is a tip position specification mode in which to operate the movable section 9 so that a tip of the movable section 9 moves to a specified position. In this case, in the operation guidance image 210 illustrated in (d) of FIG. 5, only one of arrows 215 that face in respective four directions, the only one indicating an operating direction of the at least one movable section 9 (hand), is shown so as to be different in color from the other arrows 215 that face in the respective different directions.

As described earlier, the operation guidance system 101 of Embodiment 1 includes (i) the operation terminal 2 and (ii) the HMD 3 that includes the processor 32.

The operation terminal 2 (i) receives the operation instruction that is given by the operator to the at least one movable section 9 and (ii) senses the operation standby state that allows the operation instruction to be received.

The processor 32 includes the positional relationship estimating section 321 that estimates the positional relationship between the operator and the machine 8 in accordance with (i) an image of the machine 8 which image has been obtained from the image sensor 31 and (ii) a position of the operator. Furthermore, the processor 32 includes the model generating section 322 and the coordinate transformation section 323. In a case where the operation terminal 2 senses the operation standby state, the model generating section 322 generates, in accordance with the positional relationship, the three-dimensional model in a direction that is in accordance with the direction in which the operator views the machine 8, the three-dimensional model indicating the operating direction of the at least one movable section 9 that operates in accordance with the operation instruction. Moreover, the processor 32 includes the image combining section 324 that combines the three-dimensional model with a captured image of the machine 8 that has been photographed by the image sensor 31.

With the configuration, the operating direction of the at least one movable section 9 is shown in the captured image by the three-dimensional model. This allows the operator to easily recognize the operating direction of the at least one movable section 9. Furthermore, the three-dimensional model is generated in a direction that is in accordance with the direction in which the operator views the machine 8 (at least one movable section 9). Thus, in a case where the operator changes in position, the three-dimensional model also changes in direction in accordance with such a change in position.

This makes it possible to accurately understand the operating direction, viewed from the operator, of the at least one movable section 9. Thus, the operating direction of the at least one movable section 9 to which the operator gives the operation instruction can be provided in an intelligible manner regardless of a position of the operator.

Furthermore, in a case where the three-dimensional model intuitively shows information on a function of the switch 21 (the operating direction), it is possible to not only reduce an operational error but also efficiently learn machine operation.

Moreover, it is possible to minimize eye movement. This makes it possible to (i) achieve higher operation efficiency and (ii) prevent or reduce accidents caused by carelessness of the operator.

The description of Embodiment 1 has discussed the operation guidance system 101 including the operation terminal 2 and the HMD 3. Note, however, that such a configuration is merely an example. Embodiments including Embodiment 1 are applied to not only such a configuration but also a configuration in which an operation section and a display section are integrally provided, as in a tablet terminal and a teaching pendant of a robot.

The description of Embodiment 1 has discussed an example in which the operating direction of the at least one movable section 9 is shown, by an arrow, in an image obtained by photographing the machine 8. Note, however, that a form in which the guidance display model shows the operating direction of the at least one movable section 9 is not limited to an arrow. For example, the operating direction of the at least one movable section 9 can be alternatively shown by animation by displaying a three-dimensional model of the machine 8. Further alternatively, the operating direction of the at least one movable section 9 can be shown by, for example, an icon or a pop-up image.

In the HMD 3, a notification image (e.g., a mark) indicating that the switch 21 has been pushed can be displayed. Such a notification image is generated by, for example, the model generating section 322.

The operation guidance image can include not only the operating direction of the at least one movable section 9 but also a name and/or functional information of the switch 21 that the operator has touched. Such pieces of information can also be generated by the model generating section 322.

The operation guidance image (described earlier) does not necessarily need to be displayed by the HMD 3. Alternatively, the operation guidance image can be displayed by projection such as projection mapping.

The HMD 3 has various shapes and has, for example, various display modes and projection modes. It is a matter of course that the embodiments including Embodiment 1 are independent of a shape and a mode of the HMD 3.

The processor 32 can be provided in the HMD 3 or can be provided outside the HMD 3.

The operation terminal 2 can be either a portable operation terminal or a non-portable operation terminal. For example, neither (i) a system, provided in large-scale equipment, for operating a device for carrying out photographing by moving a camera by remote operation nor (ii) a wagon-type operation device that is provided in large-scale equipment and moved with use of a caster falls under a category of a portable operation terminal.

It is possible to use a marker to (i) estimate the positional relationship between the machine 8 and the operator (image sensor 31) and (ii) detect a position at which to display the guidance display model of the operating direction of the at least one movable section 9.

In each of the embodiments including Embodiment 1, the image sensor 31 is used as a means (camera) for photographing the machine 8. Note, however, that a distance image sensor can alternatively be used instead of the image sensor 31. Furthermore, by using various sensors (e.g., an acceleration sensor, a gyro sensor, and a magnetic sensor) in combination with the camera, it is possible to improve accuracy with which to estimate a positional relationship between the machine 8 and the camera.

Examples of the information that the processor 32 obtains from (i) the machine control device 1 and (ii) the operation terminal 2 include the switch information (described earlier), the touch sensor information (described earlier), and the machine control information (described earlier). These pieces of information can be notified and obtained with use of communication (wireless communication/wired communication) (see Embodiments 2 and 3 described later) or with use of digital/analogue input/output. Furthermore, the HMD 3 can obtain information via the machine control device 1 or an external communication device.

Embodiment 2

Embodiment 2 of the present invention is as described below with reference to FIG. 6. Note that in Embodiment 2, members having functions identical to those of the respective members described in Embodiment 1 are given respective identical reference numerals, and a description of those members is omitted.

Figure 6:
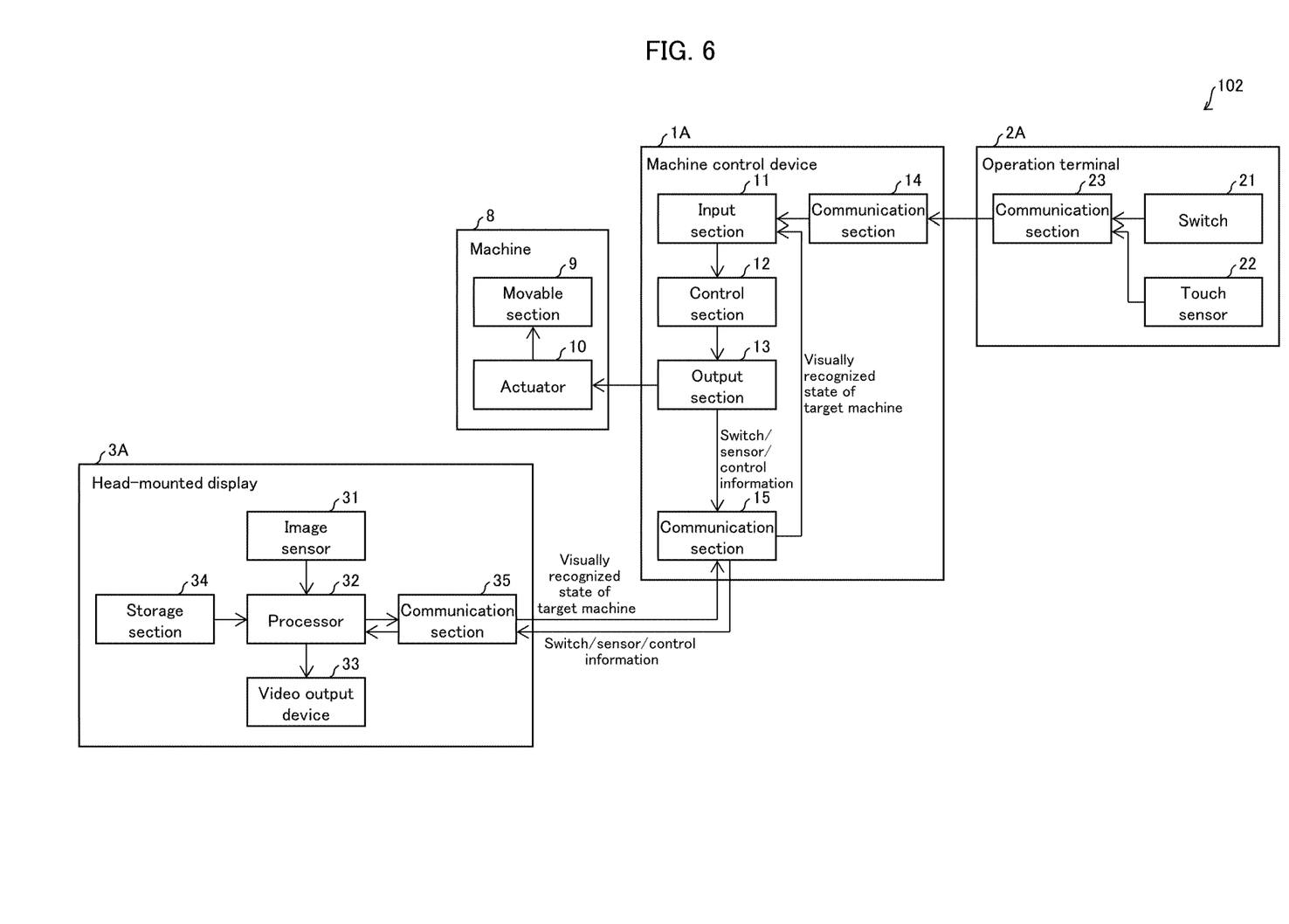
FIG. 6 is a block diagram illustrating a configuration of an operation guidance system in accordance with Embodiment 2 of the present invention.

FIG. 6 is a block diagram illustrating a configuration of an operation guidance system 102 in accordance with Embodiment 2 of the present invention.

As illustrated in FIG. 6, the operation guidance system 102 includes a machine control device 1A (control device), an operation terminal 2A (operation device), and an HMD 3A.

The machine control device 1A includes an input section 11, a control section 12, and an output section 13 as in the case of the machine control device 1 of the operation guidance system 101 of Embodiment 1. The machine control device 1A further includes communication sections 14 and 15.

The communication section 14 transmits, to the input section 11, information (switch information and touch sensor information) received from the operation terminal 2A. The communication section 15 transmits, to the HMD 3, machine control information supplied from the output section 13. The communication section 15 also transmits, to the HMD 3, received information from the operation terminal 2A and is outputted via the input section 11, the control section 12, and the output section 13. Furthermore, the communication section 15 (i) receives information on a visually recognized state of a machine 8 which information is supplied from the HMD 3A and (ii) transmits the information to the input section 11.

The operation terminal 2A includes a switch 21 and a touch sensor 22 as in the case of the operation terminal 2 of the operation guidance system 101. The operation terminal 2A further includes a communication section 23. The communication section 23 transmits the switch information and the touch sensor information to the communication section 14 of the machine control device 1A.

The HMD 3A includes an image sensor 31, a processor 32, a video output device 33, and a storage section 34 as in the case of the HMD 3 of the operation guidance system 101.

The HMD 3A further includes a communication section 35.

The communication section 35 transmits, to the communication section 15 of the machine control device 1A, the information on the visually recognized state of the machine 8 which information is supplied from the processor 32. The communication section 35 also (i) receives the machine control information and the received information from the operation terminal 2A, the machine control information and the received information each having been transmitted from the communication section 15 of the machine control device 1A, and (ii) transmits, to the processor 32, the machine control information and the received information from the operation terminal 2A.

According to the operation guidance system 102 thus configured, various pieces of information are exchanged by communication (wireless communication/wired communication). This allows various pieces of information to be exchanged among the machine control device 1A, the operation terminal 2A, and the HMD 3A with use of, for example, a local area network (LAN) or near field communication.

Embodiment 3

Embodiment 3 of the present invention is as described below with reference to FIG. 7. Note that in Embodiment 3, members having functions identical to those of the respective members described in Embodiments 1 and 2 are given respective identical reference numerals, and a description of those members is omitted.

Figure 7:
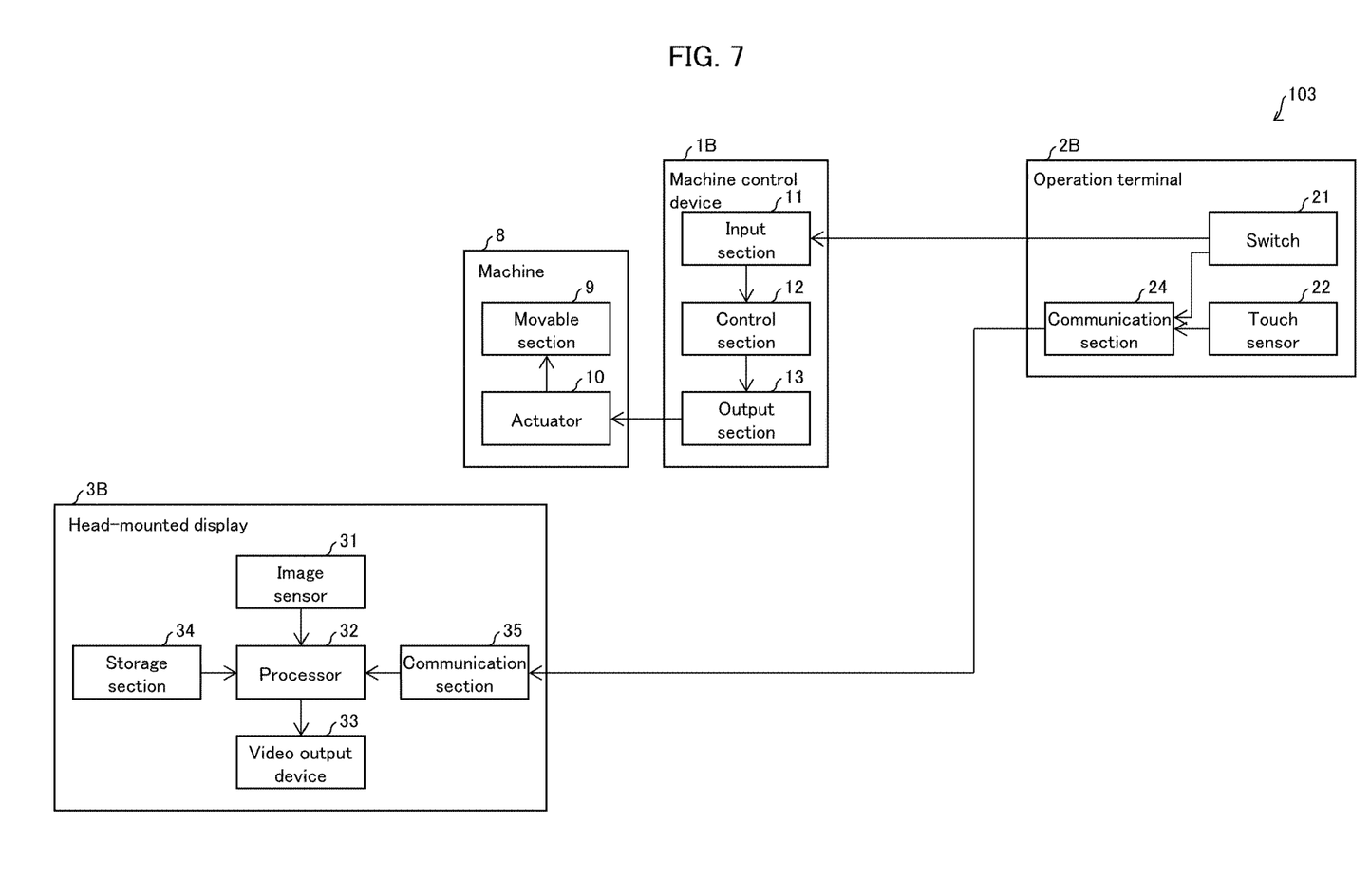
FIG. 7 is a block diagram illustrating a configuration of an operation guidance system in accordance with Embodiment 3 of the present invention.

FIG. 7 is a block diagram illustrating a configuration of an operation guidance system 103 in accordance with Embodiment 3 of the present invention.

As illustrated in FIG. 7, the operation guidance system 103 includes a machine control device 1B (control device), an operation terminal 2B (operation device), and an HMD 3B.

The machine control device 1B includes an input section 11, a control section 12, and an output section 13 as in the case of the machine control device 1 of the operation guidance system 101 of Embodiment 1. Note, however, that the input section 11 does not receive information on a visually recognized state of a machine 8 from the HMD 3B. Note also that the output section 13 does not supply machine control information to the HMD 3B.

The operation terminal 2B includes a switch 21 and a touch sensor 22 as in the case of the operation terminal 2 of the operation guidance system 101. The operation terminal 2B further includes a communication section 24. The communication section 24 transmits switch information and touch sensor information to a communication section 35 of the HMD 3B.

The HMD 3B includes an image sensor 31, a processor 32, a video output device 33, a storage section 34, and the communication section 35 as in the case of the HMD 3A of the operation guidance system 102 of Embodiment 2. Note, however, that the communication section 35 does not transmit the information on the visually recognized state of the machine 8 to the output section 13 of the machine control device 1B.

According to the operation guidance system 103 thus configured, no information is given/received between the machine control device 1B and the HMD 3B. Thus, the HMD 3B does not obtain the machine control information from the machine control device 1, and the machine control device 1B does not obtain, from the HMD 3B, the information on the visually recognized state of the machine 8.

Thus, the processor 32 (a model generating section 322) generates a guidance display model without using the machine control information. Furthermore, unlike the machine control device 1 of the operation guidance system 101, the machine control device 1B does not stop control of the machine 8 in a case where an operator is not visually recognizing the machine 8.

As such, the operation guidance system 103 has a simpler configuration as compared with the operation guidance systems 101 and 102 (described earlier), and thus can be used as a simple system at a low price.

[Software Implementation Example]

The processor 32 of the HMD 3, 3A, 3B is realized by software. The HMD 3, 3A, 3B includes a computer which executes instructions of a program that is software realizing the foregoing functions. The computer not only includes, for example, at least one processor but also includes a storage medium in which the program is computer-readably recorded. An object of the present invention can be achieved by the processor reading and executing, in the computer, the program stored in the storage medium.

Examples of the processor include a central processing unit (CPU). Examples of the storage medium encompass "a non-transitory tangible medium" such as not only a read only memory (ROM) but also a tape, a disk, a card, a semiconductor memory, and a programmable logic circuit. The computer can further include, for example, a random access memory (RAM). The program can be supplied to the computer via any transmission medium (such as a communication network or a broadcast wave) which allows the program to be transmitted. Note that an aspect of the present invention can also be achieved in the form of a computer data signal in which the program is embodied via electronic transmission and which is embedded in a carrier wave.

Aspects of the present invention can also be expressed as follows:

Operation guidance systems 101 to 103 in accordance with the respective embodiments each for providing an operator with guidance on operation of a movable device (machine 8) including a movable section 9 to be operated, the operation guidance systems 101 to 103 each include: an operation device (operation terminal 2, 2A, 2B) that (i) receives an operation instruction that is given by the operator to the movable section 9 and (ii) senses an operation standby state that allows the operation instruction to be received; a photographing device (image sensor 31) that photographs a photographing target object that is located in a direction in which the operator is looking; an estimation section (positional relationship estimating section 321) configured to estimate a positional relationship between the operator and the movable device; an image generating section (model generating section 322) configured to, in response to sensing of the operation standby state by the operation device, generate an operating direction indicating image, in accordance with the positional relationship, in a direction that is in accordance with a direction in which the operator views the movable device, the operating direction indicating image indicating an operating direction of the movable section 9, the movable section 9 operating in accordance with the operation instruction; an image combining section 324 configured to generate a combined image obtained by combining the operating direction indicating image with a captured image of the movable section 9 that has been photographed by the photographing device; and a display device (video output device 33) that displays the combined image.

With the configuration, the operating direction of the movable section 9 is shown in the captured image by the operating direction indicating image. This allows the operator to easily recognize the operating direction of the movable section 9. Furthermore, the operating direction indicating image is generated in a direction that is in accordance with the direction in which the operator views the movable device. Thus, in a case where the operator changes in position, the operating direction indicating image also changes in direction in accordance with such a change in position. This makes it possible to accurately understand the operating direction, viewed from the operator, of the movable section 9. Thus, the operating direction of the movable section 9 to which the operator gives the operation instruction can be provided in an intelligible manner regardless of a position of the operator.

The operation guidance systems 101 to 103 each can be configured such that the image generating section further generates the operating direction indicating image in accordance with control information for controlling the movable device, the control information having been obtained from a control device (machine control device 1, 1A, 1B) that controls the movable device.

With the configuration, (i) a current state of the movable section 9, such as a position of the movable section 9 and an angle of the movable section 9 and (ii) an operating state of the movable section 9, such as an operating mode of the movable device, the current state and the operating state each being obtained from the control information, can be reflected in the operating direction indicating image. This allows such pieces of information to be visually expressed as the operating direction indicating image. As such, a plurality of types of information can be obtained from the operating direction indicating image. This makes it possible to efficiently carry out operation in accordance with such pieces of information.

Operation guidance systems 101 to 103 each can be configured to further include an operation prohibiting section (positional relationship estimating section 321) configured to prohibit operation of the movable section 9 unless the photographing device photographs the movable device.

With the configuration, operation of the movable section 9 is prohibited unless the photographing device photographs the movable section 9, i.e., unless the operator views the movable section 9. This makes it possible to avoid an operational error that occurs in a case where the operator who is not looking at the movable section 9 carries out operation.

Operation guidance systems 101 to 103 each can be configured to further include a direction display section (positional relationship estimating section 321) configured to, unless the photographing device photographs the movable device, cause the display device to display the direction in which the operator views the movable device.

The configuration makes it possible to urge the operator who is not looking at the movable device to look at the movable device.

Operation guidance systems 101 to 103 each can be configured to further include a warning section (positional relationship estimating section 321) configured to, unless the photographing device photographs the movable device, issue a warning upon sensing (i) the operation standby state of the operation device or (ii) a state in which the operation device has received the operation instruction.

The configuration makes it possible to urge the operator who is not looking at the movable device to look at the movable device.

Operation guidance systems 101 to 103 each can be configured to further include a direction changing section (positional relationship estimating section 321) configured to change the operating direction of the movable section 9 in accordance with the positional relationship, the operating direction corresponding to the operation instruction.

With the configuration, in a case where the operating direction of the movable section 9 which operating direction corresponds to the operation instruction is changed, the operating direction of the movable section 9 which operating direction is made unintelligible depending on a position of the operator with respect to the movable device can be made more intelligible.

Additional Remarks

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1, 1A, 1B Machine control device (control device)
2, 2A, 2B Operation terminal (operation device)
8 Machine (movable device)
9 Movable section
31 Image sensor (photographing device)
33 Video output device (display device)
101 to 103 Operation guidance system
321 Positional relationship estimating section (estimation section, operation prohibiting section, direction display section, warning section, direction changing section)
322 Model generating section (image generating section)
323 Coordinate transformation section (image generating section)
324 Image combining section

The invention claimed is:

1. An operation guidance system for providing an operator with guidance on operation of a movable device including a movable section to be operated and being capable of operating in a plurality of operating directions, said operation guidance system comprising:

a switch that receives (i) an operation to create, before receiving an operation instruction that is given by the operator to the movable section and is in accordance with any of the plurality of operating directions, an operation standby state that allows the operation instruction to be received and (ii) an operation to receive the operation instruction;

a photographing device that photographs a photographing target object that is located in a direction in which the operator is looking;

an estimation section configured to estimate a positional relationship between the operator and the movable device;

an image generating section configured to, in response to creation of the operation standby state by the switch, generate an operating direction indicating image, in accordance with the positional relationship, in a direction that is in accordance with a direction in which the operator views the movable device, the operating direction indicating image indicating a specified one of the plurality of operating directions;

an image combining section configured to generate a combined image obtained by combining the operating direction indicating image with a captured image of the movable device that has been photographed by the photographing device;

a display device that displays the combined image; and an operation prohibiting section configured to prohibit operation of the movable section unless the photographing device photographs the movable device.

2. The operation guidance system as set forth in claim 1, wherein the image generating section further generates the operating direction indicating image in accordance with control information for controlling the movable device, the control information having been obtained from a control device that controls the movable device.

3. The operation guidance system as set forth in claim 1, further comprising a direction changing section configured to change the specified one of the plurality of operating directions in accordance with the positional relationship.

4. An operation guidance system for providing an operator with guidance on operation of a movable device including a movable section to be operated and being capable of operating in a plurality of operating directions, said operation guidance system comprising:

a switch that receives (i) an operation to create, before receiving an operation instruction that is given by the operator to the movable section and is in accordance with any of the plurality of operating directions, an operation standby state that allows the operation instruction to be received and (ii) an operation to receive the operation instruction;

a photographing device that photographs a photographing target object that is located in a direction in which the operator is looking;

an estimation section configured to estimate a positional relationship between the operator and the movable device;

an image generating section configured to, in response to creation of the operation standby state by the switch, generate an operating direction indicating image, in accordance with the positional relationship, in a direction that is in accordance with a direction in which the operator views the movable device, the operating direction indicating image indicating a specified one of the plurality of operating directions;

an image combining section configured to generate a combined image obtained by combining the operating direction indicating image with a captured image of the movable device that has been photographed by the photographing device;

a display device that displays the combined image; and a direction display section configured to, unless the photographing device photographs the movable device, cause the display device to display the direction in which the operator views the movable device.

5. An operation guidance system for providing an operator with guidance on operation of a movable device including a movable section to be operated and being capable of operating in a plurality of operating directions, said operation guidance system comprising:

a switch that receives (i) an operation to create, before receiving an operation instruction that is given by the operator to the movable section and is in accordance with any of the plurality of operating directions, an operation standby state that allows the operation instruction to be received and (ii) an operation to receive the operation instruction;

a photographing device that photographs a photographing target object that is located in a direction in which the operator is looking;

an estimation section configured to estimate a positional relationship between the operator and the movable device;

an image generating section configured to, in response to creation of the operation standby state by the switch, generate an operating direction indicating image, in accordance with the positional relationship, in a direction that is in accordance with a direction in which the operator views the movable device, the operating direction indicating image indicating a specified one of the plurality of operating directions;

an image combining section configured to generate a combined image obtained by combining the operating direction indicating image with a captured image of the movable device that has been photographed by the photographing device;

a display device that displays the combined image; and a warning section configured to, unless the photographing device photographs the movable device, issue a warning upon sensing (i) the operation standby state of the switch or (ii) a state in which the switch has received the operation instruction.

* * * * *